(12) United States Patent
Baang et al.

(10) Patent No.: US 9,589,682 B2
(45) Date of Patent: Mar. 7, 2017

(54) APPARATUS AND METHOD FOR CONTROLLING CONTROL ROD OF NUCLEAR REACTOR FOR NUCLEAR POWER PLANT

(71) Applicant: Korea Atomic Energy Research Institute, Daejeon (KR)

(72) Inventors: Dane Baang, Daejeon (KR); Je Yun Park, Daejeon (KR); Young Ki Kim, Daejeon (KR); Jong Bok Lee, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 1081 days.

(21) Appl. No.: 13/786,281

(22) Filed: Mar. 5, 2013

(65) Prior Publication Data

US 2014/0016732 A1    Jan. 16, 2014

(30) Foreign Application Priority Data

Jul. 10, 2012    (KR) .......................... 10-2012-0074862

(51) Int. Cl.
*G21C 7/14* (2006.01)
*G21C 7/18* (2006.01)
*G21C 7/36* (2006.01)

(52) U.S. Cl.
CPC ................ *G21C 7/14* (2013.01); *G21C 7/18* (2013.01); *G21C 7/36* (2013.01); *Y02E 30/39* (2013.01)

(58) Field of Classification Search
CPC ............... G21C 7/14; G21C 7/18; G21C 7/36

USPC .................................................. 376/235, 242
See application file for complete search history.

(56) References Cited

U.S. PATENT DOCUMENTS 5,102,613 A * 4/1992 Hekmati ............... F16D 27/118
376/235

FOREIGN PATENT DOCUMENTS

| JP | 2002-333494 A | 11/2002 |
|---|---|---|
| JP | 2004150928 | 5/2004 |
| JP | 2006-189314 A | 7/2006 |
| KR | 1020000040506 A | 7/2000 |
| KR | 10-2004-0013912 A | 2/2004 |

* cited by examiner

*Primary Examiner* — Jack W Keith
*Assistant Examiner* — Daniel Wasil
(74) *Attorney, Agent, or Firm* — Christensen O'Connor Johnson Kindness PLLC

(57) ABSTRACT

An apparatus for safely controlling a control rod of a nuclear reactor of a nuclear power plant. The apparatus includes a first controller to output a signal to insert or withdraw the control rod. A mechanical portion performs insertion or withdrawal of the control rod in response to the outputted signal. The mechanical portion includes a latch engagement portion, a stop latch to restrain the control rod, a moving latch to move the control rod, and a lift coil to insert or withdraw the control rod. A detector can detect a position or a speed of the control rod. A brake is configured to stop the control rod by force. A second controller operates the brake in response to a brake signal from the detector. The second controller controls the brake independent of the first controller.

9 Claims, 6 Drawing Sheets

Direction of withdrawal of control rod

Direction of withdrawal of control rod

APPARATUS AND METHOD FOR CONTROLLING CONTROL ROD OF NUCLEAR REACTOR FOR NUCLEAR POWER PLANT

CROSS-REFERENCE TO RELATED APPLICATION

This application claims the benefit of Korean Patent Application No. 10-2012-0074862, filed on Jul. 10, 2012, in the Korean Intellectual Property Office, the disclosure of which is incorporated herein by reference.

BACKGROUND

1. Field of the Invention

The present invention relates to an apparatus and method for safely controlling a control rod of a nuclear reactor for a nuclear power plant.

2. Description of the Related Art

Generally, an apparatus for controlling a control rod of a nuclear reactor may control a position and a speed of the control rod, and the like, using an automated algorithm in order to converge an output of heat or neutrons generated by the nuclear reactor to a power demand desired by a user. The apparatus is disclosed in Korean Patent Application No. 10-2002-0047040, and Japanese Patent Laid-Open Publication No. JP 2004150928.

In a nuclear reactor for a nuclear power plant, an output of the nuclear reactor may be controlled by controlling a speed of the control rod formed by a neutron absorber. However, during the controlling process, software or hardware errors may occur and controlling of the control apparatus may be performed in an inverse order. In addition, despite the control apparatus being operated in a normal state, the control rod or a control rod assembly may be withdrawn instantaneously by an external mechanical force resulting from damage to the nuclear reactor, or a rapid change in a flow speed in the nuclear reactor. When the control rod assembly is withdrawn contrary to an intended control, a neutron absorbing function of the control rod may be partially lost, and the output of the nuclear reactor may increase. Such an increase in the output of the nuclear reactor may result in critical safety problems. Accordingly, accident prevention based on a concept of safety design in nuclear power industries may be needed. In this vein, there is a need for an apparatus for sensing such an accident, and preventing a withdrawal of the control rod mechanically in order to prevent a secondary accident when an accident occurs.

SUMMARY

An aspect of the present invention provides an apparatus and method for controlling a control rod of a nuclear reactor for a nuclear power plant, the apparatus and method that may control the nuclear reactor more safely by stopping a withdrawal of the control rod mechanically because an output of the nuclear reactor may increase when the control rod is withdrawn irrespective of an intended control of the control rod.

According to an aspect of the present invention, there is provided an apparatus for controlling a control rod of a nuclear reactor for a nuclear power plant, the control rod to be inserted into or withdrawn from the nuclear reactor, the apparatus including a first controller to output a signal to insert or withdraw the control rod, a mechanical portion to perform insertion or withdrawal of the control rod in response to the signal output by the first controller, the mechanical portion including a movement process portion disposed at an upper end of the control rod, a stop latch to restrain the control rod by an electromagnetic interaction with the movement process portion, a moving latch to move the control rod by restraining the control rod by an electromagnetic interaction with the movement process portion, and a lift coil to insert or withdraw the control rod by lifting or lowering the moving latch fixed to the moving process portion, a detector to detect a position or a speed of the control rod when the control rod is inserted or withdrawn by the mechanical portion, and a brake to stop the control rod by force when the control rod is withdrawn irrespective of an intended control of the control rod.

According to another aspect of the present invention, there is also provided a method of controlling a control rod of a nuclear reactor for a nuclear power plant, the method including, when the control rod is withdrawn irrespective of an intended control of the control rod, due to a malfunction of an apparatus for controlling the control rod of the nuclear reactor for the nuclear power plant, detecting, by a detector, a data value corresponding to a position or a speed of the control rod, transmitting the detected value to a second controller, transmitting a command to operate a brake based on the value transmitted to the second controller, and quickly stopping, by the brake, the abnormal withdrawal of the control rod by force, based on the transmitted command.

In controlling a control rod of a nuclear reactor for a nuclear power plant using the configuration and method described above, since an output of the nuclear reactor may be increased when the control rod is withdrawn irrespective of an intended control, the nuclear reactor may be controlled more safely by stopping the withdrawal of the control rod mechanically.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
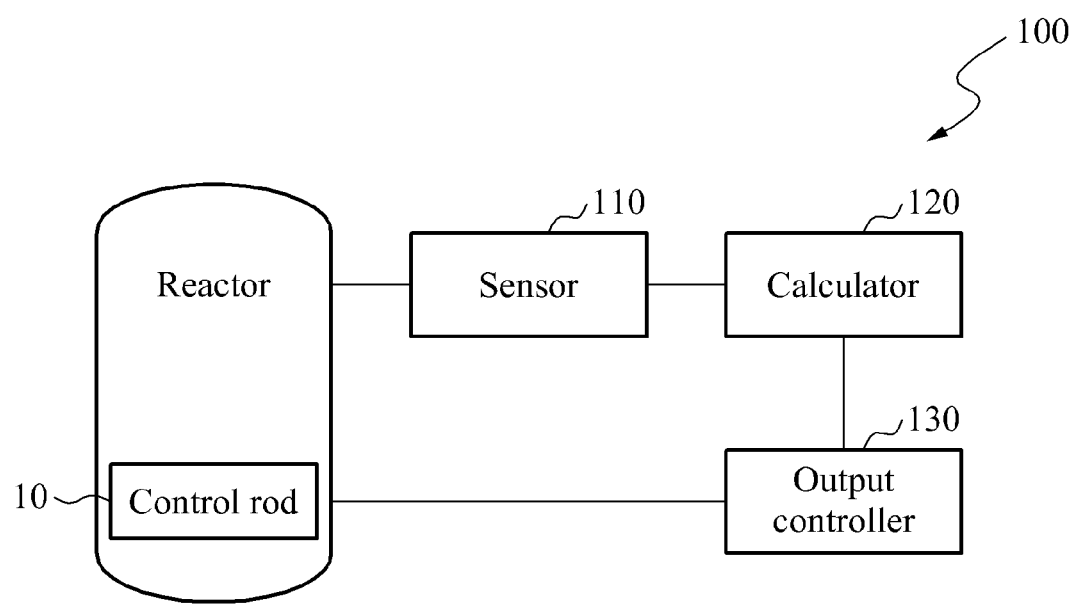
FIG. 1 is a diagram illustrating a configuration of a system for controlling an output of a nuclear reactor provided to describe an apparatus for controlling a control rod of a nuclear reactor for a nuclear power plant according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a system for controlling an output of a nuclear reactor according to an embodiment of the present invention will be described in detail with reference to FIG. 1.

FIG. 1 is a diagram illustrating a configuration of a system 100 for controlling an output of a nuclear reactor provided to describe an apparatus for controlling a control rod of a nuclear reactor for a nuclear power plant according to an embodiment of the present invention.

Referring to FIG. 1, the system 100 may include a sensor 110 to sense an output of heat or neutrons generated by the nuclear reactor, a calculator 120 to calculate an error of the sensed output of the heat or the neutrons with respect to a predetermined power demand, and to calculate a control pressure based on the error, and an output controller 130 to control a position of a control rod 10 based on the control pressure.

The system 100 may be configured to control an output of the nuclear reactor by controlling the position of the control rod 10. The output of the nuclear reactor may correspond to the output of the heat or the neutrons. A nuclear power plant using the system 100 may increase the output of the heat or the neutron when the control rod 10 is withdrawn from the nuclear reactor, for example, when the control rod 10 rises from the nuclear reactor.

The sensor 110 may sense the output of the heat or the neutrons generated by the nuclear reactor, and may output the sensed output of the heat or the neutrons to the calculator 120.

The calculator 120 may calculate an error of the output of the heat or the neutrons with respect to the predetermined power demand, calculate a control pressure based on the error, and output the calculated control pressure to the output controller 130. The control pressure may correspond to a speed of movement of the control rod 10.

The output controller 130 may control the position of the control rod 10 based on the control pressure.

The calculator 120 may be configured to detect the control pressure, using a predetermined output controlling algorithm. The predetermined output controlling algorithm may employ a method of increasing the output by withdrawing, for example, raising, the control rod 10 when a current output is lower than the predetermined power demand, and decreasing the output by inserting, for example, lowering, the control rod 10 when the current output is higher than the predetermined power demand.

Hereinafter, an apparatus for controlling a control rod of a nuclear reactor for a nuclear power plant according to an embodiment of the present invention will be described in detail with reference to FIGS. 2 through 4.

Figure 2:
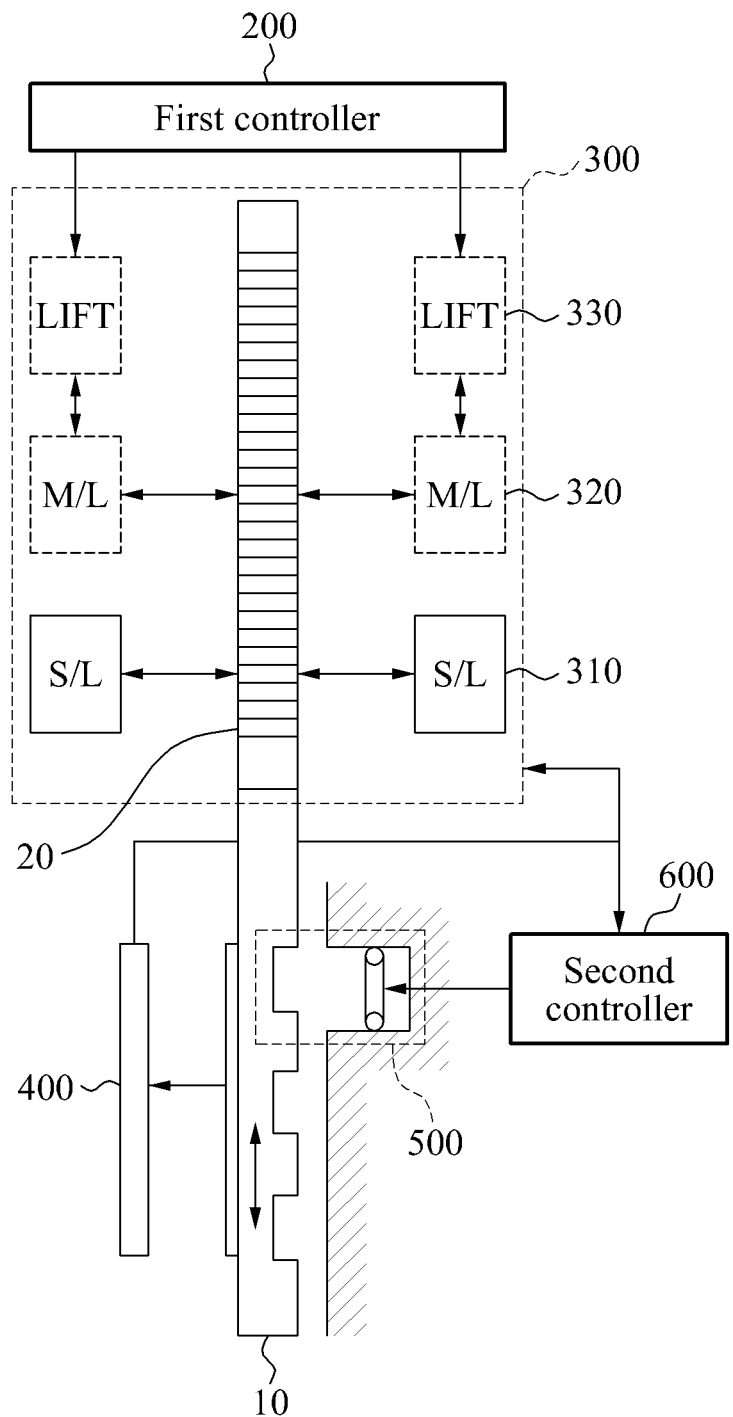
FIG. 2 is a diagram illustrating a configuration of an apparatus for controlling a control rod of a nuclear reactor for a nuclear power plant according to an embodiment of the present invention.

FIG. 2 is a diagram illustrating a configuration of an apparatus for controlling a control rod of a nuclear reactor for a nuclear power plant according to an embodiment of the present invention.

Referring to FIG. 2, the apparatus, by which a control rod 10 may be inserted into or withdrawn from the nuclear reactor, may include a first controller 200 to output a signal to insert or withdraw the control rod 10, a mechanical portion 300 to perform insertion or withdrawal of the control rod 10 in response to the signal output by the first controller 200, a detector 400 to detect a position or a speed of the control rod 10 when the control rod 10 is inserted or withdrawn by the mechanical portion 300, and a brake 500 to stop the control rod 10 by force when the control rod 10 is withdrawn irrespective of an intended control of the control rod 10. Here, the mechanical portion 300 may include a movement process portion 20 disposed at an upper end of the control rod 10, a stop latch 310 to restrain the control rod 10 by an electromagnetic interaction with the movement process portion 20, a moving latch 320 to move the control rod 10 by restraining the control rod 10 by an electromagnetic interaction with the movement process portion 20, and a lift coil 330 to insert or withdraw the control rod 10 by lifting or lowering the moving latch 320 fixed to the moving process portion 20. The apparatus may further include a second controller 600 to operate the brake 500 in response to a brake signal being received from the detector 400.

The first controller 200 may control a position or a speed of the control rod 10, based on data associated with the insertion or the withdrawal of the control rod 10, and may obtain a desired output of the nuclear reactor by controlling the control rod 10.

In addition, a control value output by the first controller 200 may be transferred to the mechanical portion 300. The mechanical portion 300 may be operated based on the control value. The control rod 10 may be inserted or withdrawn by the mechanism portion 300.

As an example, the first controller 200 may control the insertion or the withdrawal of the control rod 10 in the nuclear reactor, using a data output value.

The mechanical portion 300 may include the movement process portion 20, the stop latch 310, the moving latch 320, and the lift coil 330. At least three pairs of latches and coils may be operated by sequential movement and dissolution.

The stop latch 310 may be inserted into a recess of the movement process portion 20 disposed in an upper portion of the control rod 10 to stop the control rod 10.

For example, the stop latch 310 of the mechanical portion 300 may be inserted into or withdrawn from the recess of the movement process portion 20 disposed in the upper portion of the control rod 10 by an electromagnetic interaction, like an electromagnet, using a control algorithm of the first controller 200. The stop latch 310 may stop the control rod 10 according to an intended control.

The moving latch 320 may be inserted in the recess of the moving process portion 20 disposed in the upper portion of the control rod 10 to control a movement of the control rod 10.

For example, the moving latch 320 of the mechanical portion 300 may be inserted into or withdrawn from the recess of the moving process portion 20 disposed in the upper portion of the control rod 10 by an electromagnetic interaction, like an electromagnet, using the control algorithm of the first controller 200. The moving latch 320 may move the control rod 10 according to an intended control.

In addition, the moving latch 320 may be connected to the lift coil 300, and may be lifted or lowered by the lift coil 330.

The lift coil 330 may lift or lower the moving latch 320, and may correspond to a main power source for inserting or withdrawing the control rod 10. In addition, the lift coil 330 may control a position or a speed at which the control rod 10 is to be inserted or withdrawn.

That is, the lift coil 330 may control the position or the speed at which the control rod 10 is to be inserted or withdrawn, based on a control signal of the first controller 200.

The detector 400 may correspond to a linear encoder. The detector 400 may detect linear position information of the control rod 10, and may calculate a speed of the control rod 10 based on the detected linear position information. When the calculated speed is greater than or equal to a predetermined reference value, the detector 400 may transfer an output signal to the first controller 200 or the second controller 600.

For example, the detector 400 corresponding to the linear encoder may recognize an insertion or a withdrawal of the control rod 10 by recognizing the position of the control rod 10, and may control the control rod 10 according to an intended control, by extracting speed information of the control rod 10 from the position information. In addition, the detector 400 may apply a blocking signal to a blocking portion (not shown) connected to the mechanical portion 300, thereby blocking a power to be applied to the mechanical portion 300.

The brake 500 may stop the control rod 10 mechanically when the control rod 10 is withdrawn contrary to an intended control, due to an electrical or mechanical malfunction of the nuclear reactor.

For example, the control rod 10 may be withdrawn irrespective of an intended control due to an error in a control circuit of the first controller 200. Also, the control rod 10 may be withdrawn when a coupling between the control rod 10 and the control apparatus is damaged due to unexpected factors, for example, damage to the nuclear reactor, a change in a flow speed, and the like. In this instance, the brake 500 may stop the control rod 10 mechanically to prevent a further withdrawal of the control rod 10, thereby preventing an increase in the output of the nuclear reactor.

The second controller 600 may control the brake 500, by outputting an electrical signal to the brake 500 based on a resulting value detected by the detector 400.

For example, the second controller 600 may compare a data value detected with respect to the position or the speed of the control rod 10 by the detector 400 to a predetermined control value. When the detected data value differs from the predetermined control value, the second controller 600 may determine that an accident happens, and may output a braking command to the brake 500, thereby stopping the control rod 10 by force.

Figure 3:
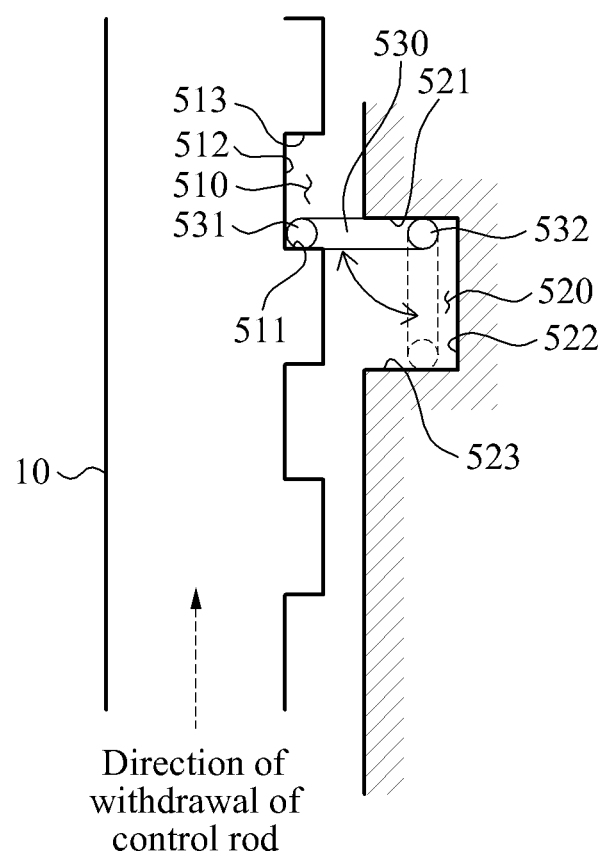
FIG. 3 is a cross-sectional view illustrating a brake included in an apparatus for controlling a control rod of a nuclear reactor for a nuclear power plant according to an embodiment of the present invention.

FIG. 3 is a cross-sectional view illustrating a brake 500 included in an apparatus for controlling a control rod 10 of a nuclear reactor for a nuclear power plant according to an embodiment of the present invention.

Referring to FIG. 3, the brake 500 in the apparatus for controlling the control rod 10 of the nuclear reactor for the nuclear power plant may include a first recess 510 disposed on a side of the control rod 10, a second recess disposed on an external wall corresponding to the first recess 510, and a stopper 530 disposed in an internal portion of the second recess, and configured to be inserted into the first recess 510 to stop a withdrawal of the control rod 10 by force.

The first recess 510 may be formed by a first wall 511, a second wall 512, and a third wall 513. A plurality of first recesses 510 may be disposed on the external surface of the control rod 10 at regular intervals.

In addition, a shape and a size of the first recess 510 are not limited to the embodiment of FIG. 3, and may vary depending on a structure of the control rod 10.

The second recess 520 may be formed by a first wall 521, a second wall 522, and a third wall 523. The second recess 520 may be disposed on the external wall corresponding to the control rod 10, and may form a space sufficient for installing the stopper 530.

In addition, a shape and a size of the second recess 520 are not limited to the embodiment of FIG. 3, and may vary depending on a structure of the control rod 10

A spring 532 or a hydraulic device 532 may be disposed at an end of the stopper 530, and a roller 531 may be disposed at another end.

In addition, when the control rod 10 operates normally, the stopper 530 may be fixed in the second recess 520 while the spring 532 or the hydraulic device 532 is compressed. When the control rod 10 is withdrawn due to a malfunction, a pressure of the spring 532 or the hydraulic device 532 may be released. In this instance, the stopper 530 may rotate perpendicularly such that a side surface of the stopper 530 may be in contact with the first wall 521 of the second recess 520, and another side surface of the stopper 530 may be in contact with the first wall 511 of the first recess 510.

In particular, when the control rod 10 operates normally, the stopper 530 may be stopped in an internal portion of the second recess 520 while being compressed by a device, for example, the spring 532 or the hydraulic device 532. When the control rod 10 is withdrawn due to a malfunction, the second controller 600 may transmit a brake signal to the brake 500. The pressure of the spring 532 or the hydraulic device 532 may be released, the stopper 530 may rotate perpendicularly such that a side surface of the stopper 530 may be in contact with the first wall 521 of the second recess 520, and another side surface of the stopper 530 may be in contact with the first wall 511 of the first recess 510. Accordingly, the withdrawal of the control rod 10 caused by the malfunction may be prevented.

Figure 4:
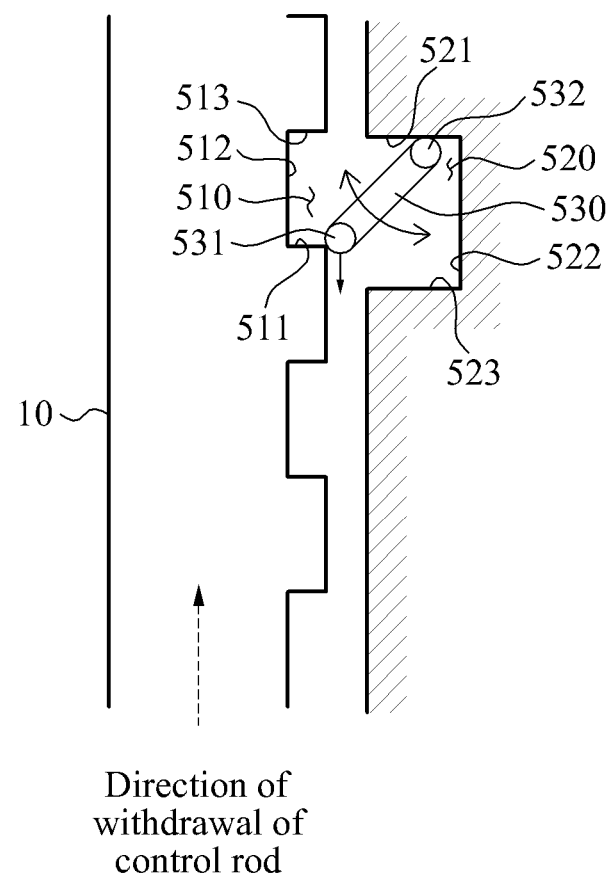
FIG. 4 is a cross-sectional view illustrating a stopper according to an embodiment of the present invention.

FIG. 4 is a cross-sectional view illustrating a stopper according to an embodiment of the present invention.

Referring to FIG. 4, a brake 500 may include a first recess 510 disposed on a side of a control rod 10, a second recess 520 disposed on an external wall corresponding to the first recess 510, and a stopper 530 disposed in an internal portion of the second recess 520, and configured to be inserted into the first recess 510 to stop a withdrawal of the control rod 10 by force. In this instance, a plurality of first recesses 510 may be disposed on an external surface of the control rod 10 at regular intervals. In addition, a roller 531 may be disposed in the stopper 530.

Here, the first recess 510 may be formed by a first wall 511, a second wall 512, and a third wall 513, and the second recess 520 may be formed by a first wall 521, a second wall 522, and a third wall 523.

In a case in which the stopper 530 is in contact with a projection (not shown), as opposed to the first recess 510 of the control rod 10 when the stopper 530 rotates due to a malfunction of the control rod 10, the roller 531 of the stopper 530 may slide along a surface of the projection, thereby preventing the stopper 530 from being damaged by an external force or friction. In addition, since the roller 531 may slide along the surface of the projection to be in contact with the first wall 511 of the first recess 510, the control rod 10 may be stopped by force.

In addition, when the control rod 10 is inserted, for example, lowers, the roller 531 of the stopper 530 may be pushed down by the control rod 10 in an inserting direction of the control rod 10, and the stopper 530 may be fixed in the second recess 520 by an electromagnetic interaction.

For example, when the control rod 10 is inserted, the roller 531 of the stopper 530 may be pushed down in a lower direction by the projection of the control rod 10, and may be pushed into the second recess 520 such that the stopper 530 may be fixed in the second recess 520 by an electromagnetic interaction. Accordingly, since the stopper 530 may be pushed by the projection of the control rod 10 to be fixed in the second recess 520 when the control rod 10 is inserted, the stopper 530 may not act as a brake and thus, a safety of the nuclear reactor may be secured. Here, the roller 531 of the stopper 530 may correspond to a compression roller.

Hereinafter, an apparatus for controlling a control rod of a nuclear reactor for a nuclear power plant according to another embodiment of the present invention will be described in detail with reference to FIGS. 5A and 5B.

Figure 5A:
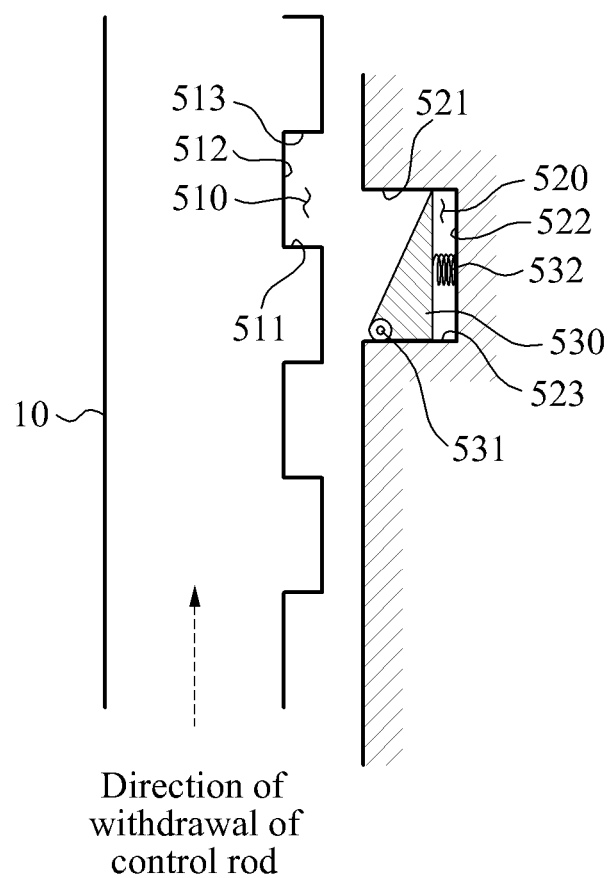
FIGS. 5A and B are cross-sectional views illustrating a stopper according to another embodiment of the present invention.
Figure 5B:
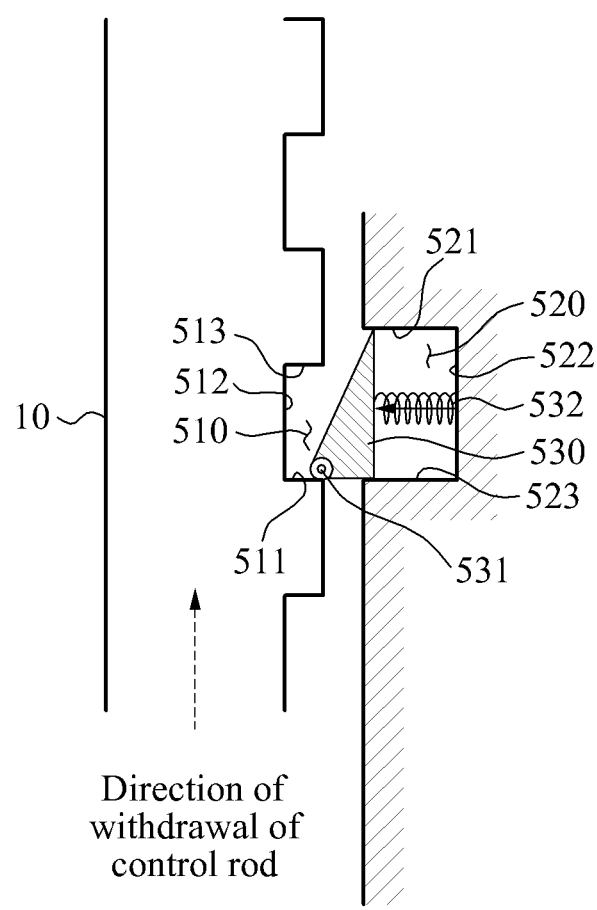

FIGS. 5A and 5B are cross-sectional views illustrating a stopper according to another embodiment of the present invention.

Referring to FIGS. 5A and 5B, a brake 500 may include a first recess 510 disposed on a side of a control rod 10, a second recess 520 disposed on an external wall corresponding to the first recess 510, and a stopper 530 disposed in an internal portion of the second recess 520, and configured to be inserted into the first recess 510 to stop a withdrawal of the control rod 10 by force.

Here, the first recess 510 may be formed by a first wall 511, a second wall 512, and a third wall 513, and the second recess 520 may be formed by a first wall 521, a second wall 522, and a third wall 523. In addition, a plurality of first recesses 510 may be disposed on an external surface of the control rod 10 at regular intervals.

FIG. 5A illustrates the stopper 530 of the brake 500 being fixed in the internal portion of the second recess 520 when the control rod 10 operates normally, and 5B illustrates the stopper 530 of the brake 500 being inserted into an internal portion of the first recess 510 when the control rod 10 is withdrawn due to a malfunction.

The stopper may 530 include an inclined surface disposed at a position corresponding to the first recess 510. A surface of the stopper 530 may be fixed to the second recess 520 by a spring 532 or a hydraulic device 532, and a roller 531 may be disposed on a bottom surface of the stopper 530.

In addition, when the control rod 10 operates normally, the stopper 530 may be fixed in the second recess 520 while the spring 532 or the hydraulic device 532 is compressed. When the control rod 10 is withdrawn due to a malfunction, a pressure of the spring 532 or the hydraulic device 532 may be released. In this instance, the stopper 530 may protrude in a direction of the control rod 10 such that a portion of the bottom surface of the stopper 530 may be in contact with the first wall 511 of the first recess 510, and a portion of the stopper 530 may be fixed in the second recess 520. Accordingly, when the portion of the stopper 530 is inserted into the first recess 510, the withdrawal of the control rod 10 caused by the malfunction may be prevented. Here, the roller 531 of the stopper 530 may correspond to a compression roller.

In a case in which the stopper 530 is in contact with a projection (not shown), as opposed to the first recess 510 of the control rod 10 when the stopper 530 protrudes in the direction of the control rod 10 due to a malfunction of the control rod 10, the roller 531 of the stopper 530 may slide along a surface of the projection, thereby preventing the stopper 530 from being damaged by an external force or friction. In addition, since the roller 531 may slide along the surface of the projection to be in contact with the first wall 511 of the first recess 510, the control rod 10 may be stopped by force.

In addition, when the control rod 10 is inserted to be in contact with the inclined surface of the stopper 530, the stopper 530 may be pushed in a direction of the second recess 520 by the control rod 10, and may be fixed in the second recess 520 by an electromagnetic interaction. Accordingly, since the control rod 10 may be inserted in a lower direction while sliding along the inclined surface of the stopper 530 when the control rod 10 is inserted, the stopper 530 may not act as a brake and thus, a safety of the nuclear reactor may be secured.

A braking time of the control rod 10 may be determined based on a withdrawing speed of the control rod 10, a density of the first recess 510, a distance from the control rod 10 to the external wall, and the like. Accordingly, the braking time of the control rod 10 may be extended or shortened by adjusting the foregoing factors.

Hereinafter, a method of controlling a control rod of a nuclear reactor for a nuclear power plant according to an embodiment of the present invention will be described in detail.

The method may include, when the control rod is withdrawn due to an error in an apparatus for controlling the control rod of the nuclear reactor for the nuclear power plant, detecting, by a detector, a data value corresponding to a position or a speed of the control rod, transmitting the detected value to a second controller, operating, by the second controller, a brake based on the transmitted signal, and stopping, by a stopper of the brake being inserted in a first recess, the abnormal withdrawal of the control rod mechanically. Here, the method may further include determining, by the second controller, a malfunction of the control rod, by comparing the value detected by the detector to a predetermined control value.

In addition, the method may further include controlling the stopper to be fixed in an internal portion of a second recess, or to be inoperative when the control rod is inserted.

Accordingly, the apparatus and method for controlling the control rod of the nuclear reactor for the nuclear power plant may stop the control rod mechanically when a safety accident occurs due to a malfunction or an excessive speed of the control rod, thereby minimizing an over-inserting time of the control rod and preventing an increase in an output of the nuclear reactor.

According to exemplary embodiments of the present invention, there is provided an apparatus and method for controlling a control rod of a nuclear reactor for a nuclear power plant, the apparatus and method that may control the nuclear reactor more safely by stopping a withdrawal of the control rod mechanically because an output of the nuclear reactor may increase when the control rod is withdrawn irrespective of an intended control of the control rod.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for controlling a control rod of a nuclear reactor of a nuclear power plant, wherein the control rod is configured to be inserted into or withdrawn from the nuclear reactor, the apparatus comprising:
   a control rod, wherein the control rod includes recesses;
   a first controller operable to output a signal to insert or withdraw the control rod;
   a mechanical portion configured to perform insertion or withdrawal of the control rod in response to the signal output by the first controller, the mechanical portion comprising a latch engagement portion disposed at an upper end of the control rod, a stop latch electromechanically moveable to restrain the control rod by an engagement with the latch engagement portion, a moving latch electromechanically moveable to be fixed to the latch engagement portion, and a lift coil operable to insert or withdraw the control rod by lifting or lowering the moving latch fixed to the latch engagement portion;

a detector operable to detect a position or a speed of the control rod when the control rod is being inserted or withdrawn by the mechanical portion; and a brake configured to stop the control rod by force, wherein the brake includes a stopper configured to be inserted into a recess of the recesses comprising a first recess, and wherein the stopper comprises an inclined surface; and a second controller operable to separately control the brake independent of the first controller, wherein the second controller is configured to operate the brake in response to a brake signal being received from the detector.

2. The apparatus of claim 1, wherein the brake further comprises:

a second recess disposed on an external wall, wherein the stopper is movable from an internal portion of the second recess to an internal portion of the first recess to stop the withdrawal of the control rod by force.

3. The apparatus of claim 2, wherein the stopper comprises a spring or a hydraulic device on an end, and a roller on another end.

4. The apparatus of claim 3, wherein the stopper is fixed in the second recess while the spring or the hydraulic device is compressed, and when a pressure of the spring or the hydraulic device is released, the stopper turns such that a side surface of the stopper is in contact with a surface of the second recess, and another side surface of the stopper is in contact with a surface of the first recess.

5. The apparatus of claim 3, wherein the roller of the stopper is pushed down by the control rod in an inserting direction of the control rod, and the stopper is fixed in the second recess by an electromagnetic interaction.

6. The apparatus of claim 3, wherein the inclined surface is disposed at a position corresponding to the first recess, wherein a second surface of the stopper is fixed to the second recess by the spring or the hydraulic device, and the roller is disposed on a bottom surface of the stopper.

7. The apparatus of claim 3, wherein the stopper is fixed in the second recess while the spring or the hydraulic device is compressed, and when a pressure of the spring or the hydraulic device is released, the stopper protrudes in a direction of the control rod such that a bottom surface of the stopper is in contact with a surface of the first recess.

8. The apparatus of claim 6, wherein the stopper is pushed in a direction of the second recess by the control rod, and fixed in the second recess by an electromagnetic interaction when the control rod is inserted to be in contact with the inclined surface of the stopper.

9. The apparatus of claim 2, wherein a plurality of first recesses is formed in the control rod at regular intervals.

* * * * *